United States Patent [19]
Nagata et al.

[11] 3,806,211
[45] Apr. 23, 1974

[54] THRUST SUPPORT MEANS FOR VERTICAL SHAFT TYPE ROTARY MACHINE

[75] Inventors: Ichiro Nagata; Hiroshi Sato, both of Hitachi, Japan

[73] Assignee: Hitachi, Ltd., Cheyoda-ku, Tokyo, Japan

[22] Filed: July 26, 1972

[21] Appl. No.: 275,161

[52] U.S. Cl. ............................................. 308/160
[51] Int. Cl. .......................................... F16c 35/00
[58] Field of Search ......... 308/160, 22, 15, 76, 168, 308/172

[56] References Cited
UNITED STATES PATENTS
3,549,922 12/1970 Kostin.............................. 308/160

*Primary Examiner*—Manuel A. Antonakas
*Assistant Examiner*—Frank Susko
*Attorney, Agent, or Firm*—Craig and Antonelli

[57] ABSTRACT

In a vertical shaft type rotary machine, it is necessary to provide support means for supporting the weights of rotatable parts on a base through thrust bearing means. The present invention comprises thrust support means of this type which includes an annular body being disposed co-axially to the rotatable shaft of the machine, one apex of the triangle receiving said thrust bearing means, and another apex being seated on the support base for the machine.

6 Claims, 1 Drawing Figure

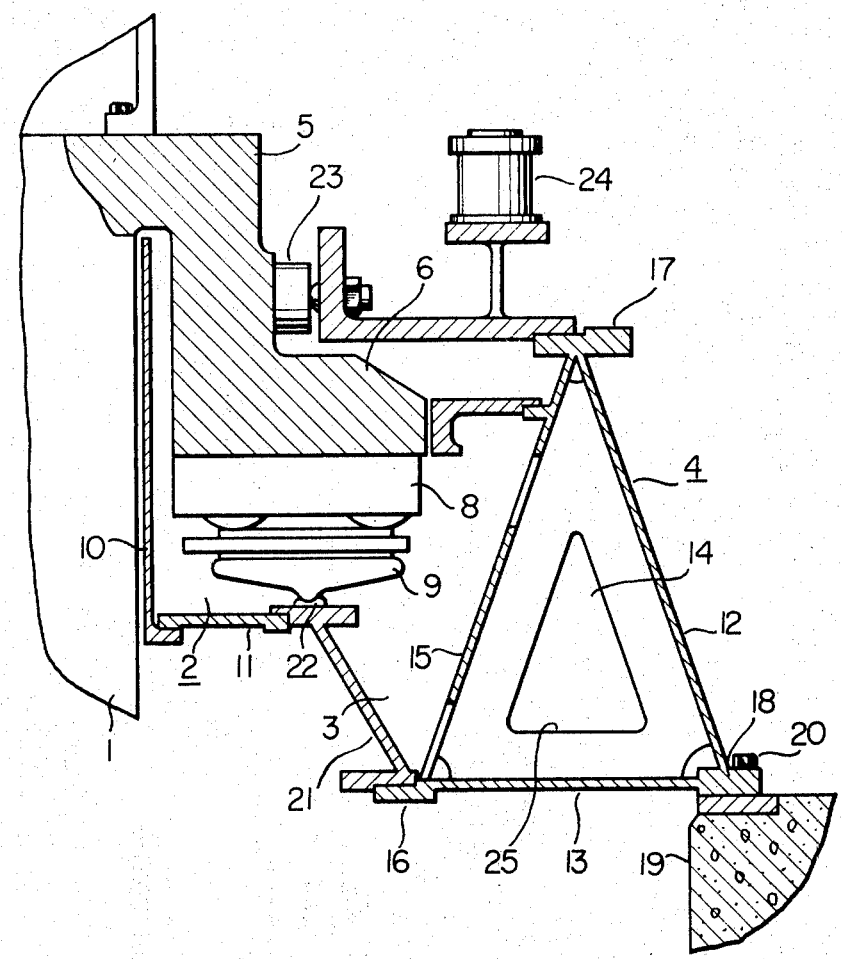

3,806,211

THRUST SUPPORT MEANS FOR VERTICAL SHAFT TYPE ROTARY MACHINE

BACKGROUND OF THE INVENTION

The present invention relates to an improvement of thrust support means for a vertical shaft type rotary machine such as a vertical shaft type water turbine generator or a vertical shaft type pump, and more particularly to an improvement of a bracket used in a large machine for supporting the thrust of rotatable parts on a base member.

In a large vertical shaft type rotary machine, since it has a substantial weight, very large load is transmitted through thrust bearing means to a base member. For example, in a water turbine generator, a thrust bearing is used to support the weights of the rotor of the generator and the rotatable parts of the turbine as well as the thrust component acting on the turbine. Therefore, the bearing must sometimes transmit several thousand tons of load to the base member.

Conventionally, a commonly employed thrust support means or a bracket of this type is supported on a base frame by means of arms extending radially from an oil tank means receiving a thrust bearing, so that load is transmitted by the bending resistance of the arms.

In designing a mechanical structure, it is desirable to have all members of the structure uniformly share a load in order to obtain a light weight structure. Further, it is also desirable that each member of the structure is subjected to a simple stress condition, such as a tensile stress or a compression stress. Since the modulus of rigidity is substantially low as compared with the modulus of elasticity, it is not desirable to use a member under a shear stress.

From this point of view, the conventional bracket structure is not advantageous since the load is supported by the bending resistance or the shear strength of the arms and the materials of the structural members are not efficiently utilized. Thus, according to the conventional structure, it is impossible to reduce the weight of the structure unless the allowable stress level is increased. When the allowable stress level is increased, the rigidity of the structure is correspondingly decreased resulting in an undesirable increase in deformation and vibration.

Therefore, the present invention has an object to provide a novel structure which has a reasonable load transmitting path and in which all members constituting a bracket evenly share a load. According to the present invention, it is possible to obtain support means of the aforementioned type which is light in weight and has an increased strength and rigidity.

SUMMARY OF THE INVENTION

According to the present invention, the above and other objects can be achieved by a thrust support means including a bracket which is constituted by an annular body of a hollow triangular cross-section, at least one apex of the triangle being used to receive a thrust load from the rotatable parts or the thrust bearing means, at least one of the other apexes being adapted to seat on the base member.

BRIEF DESCRIPTION OF THE DRAWING

The drawing is a fragmentary sectional view of a vertical shaft type rotary machine including a thrust support means of the present invention.

DESCRIPTION OF THE PREFERRED EMBODIMENT

The present invention will now be described with respect to a preferred embodiment shown in the drawing.

Referring to the drawing, there are shown a part of a rotatable shaft 1 of a water turbine generator, a thrust bearing means 2, an oil tank 3 and a bracket 4.

The rotatable shaft 1 has a thrust bearing 5 secured thereto and provided with a runner portion 6 at the radially outward part thereof. The oil tank 3 is employed in order to receive therein the thrust bearing means 2 which comprises a bearing shoe 8 and a support structure 9. Further, the oil tank 3 contains lubricant oil and has a cooler (not shown) for cooling the lubricant.

The oil tank 3 is in part constituted by an inner cylindrical wall 10 and a bottom plate 11, and in part by a portion of the bracket 4.

Briefly speaking, the bracket 4 comprises an annular body having a triangular cross-section including an outer wall 12 and a bottom wall 13 which constitute an outer side wall of the oil tank 3.

The arrangement in which the outer wall 12 and the bottom wall 13 of the bracket 4 serve as the outer wall of the oil tank so that the cavity of the oil tank 3 is increased by the hollow interior 14 of the bracket resulting that the thermal capacity of the lubricant is increased. When it is not necessary to increase the capacity of the oil tank, the inner wall 15 of the bracket 4 may be used as the outer wall of the oil tank 3.

The bracket 4 has annular flanges 16, 17 and 18 secured one to each of the apexes of the triangle. The outer flange 18 is secured to a base frame 19 by means of bolts 20. Thus, the bracket 4 is supported on the base frame 19 and therefore the thrust load from the rotatable shaft 1 and that from the thrust bearing means 2 can be supported by this structure. The portion of the bracket which receives the thrust load is the inner flange 16. In order to effectively transmit the load from the bearing means 2 to the flange 16, an annular member 21 is interposed between the support structure 9 and the flange 16.

In the illustrated embodiment, the annular member 21 is provided because the structural arrangement does not allow to have the support structure directly supported by the flange 16. Therefore, if possible, it is desirable to have the support point 22 of the support structure 9 directly seated on the flange 16. In any event, it is of course desirable from the view point of mechanical strength to have the load distributed around the apex of the triangular cross section of the bracket 4.

The flange 17 provided at the upper apex of the bracket 4 serves to support a guide bearing 23 and brake means 24, and also to prevent distortion of the annular body.

The bracket 4 is further provided with reinforcement plates such as shown by the reference numeral 25 at the hollow interior or the outer surface thereof in order to prevent any possible deformation. Further, the bracket 4 may be provided with seats for mounting other necessary parts and also with acess holes or air vent and drain holes, although they are not essential to the feature of the present invention.

Referring to the load transmission in the bracket structure, since the flanges 16, 17 and 18 are secured to the walls of the annular body at the apexes of the triangle of its cross-section, the load is applied to one of the apexes and supported at another apex. Since a load exerted on a connection of members can be divided into components parallel to the members, the load can be exerted on each of the members in the form of a pure tensile or compressive force. Further, each of the members bear a corresponding force component, a uniform stress distribution can be obtained. Due to the aforementioned theory, the structure of the present invention is advantageous in that the material of the structure can be effectively used.

In a high capacity and high speed machine, the temperature of the thrust bearing in the oil tank is increased by increasing the peripheral speed and the load on the bearing and therefore there has been a problem of cooling the lubricant oil in the tank. Conventionally, a cooler or a heat exchanger has been provided inside or outside the tank for circulating and cooling the lubricant oil therein. If cooling medium to be circulated through the cooler is interrupted due to any possible accident, a serious problem will be produced. In order to ensure a safe operation of the machine even under a malfunction of the cooler, it is desirable to increase the capacity of the oil tank so that any increase in temperature of the bearing can be absorbed by the lubricant oil in the tanks until any protective action is taken by an operator.

According to conventional structures, it has been very difficult to increase the capacity of the oil tank without weakening the bracket. However, according to the present invention, the bracket is constituted by an annular body of a hollow triangular cross-section, so that the hollow interior of the annular body can be used as a part of the oil tank. Thus, the capacity of the oil tank can readily be increased. Therefore, the structure of the present invention makes it possible to ensure a safe and prolonged operation of a high capacity and high speed machine.

As described above, the thrust support means of the present invention can be made light in weight with less expensive manufacturing cost because all members constituting the bracket effectively work to share the load. Further, the structure has a substantial rigidity and is effective to exclude any vibration and deformation. Further, a space enclosed by main structural members is effectively used as a part of the oil tank, so that the capacity of the oil tanks is increased and a safe operation can be ensured.

What is claimed is:

1. Thrust support means for a vertical shaft type rotary machine comprising thrust bearing means, oil tank means for receiving said thrust bearing means, and a bracket for supporting at least said thrust bearing means and said oil tank means, said bracket comprising an annular body of hollow triangular cross-section, at least one of the apexes of the triangle receiving a load from said thrust bearing means and at least one of the remaining apexes being supported by a base frame, the hollow interior of the annular body being in liquid communication with the interior of the oil tank means, so that the interior of the annular body is used as a part of the oil tank.

2. Thrust supporting means for a vertical shaft type rotary machine comprising: an annular hollow bracket of triangular cross-section supporting an oil tank receiving a thrust bearing through an annular flange fixed along one of the apex portions of said bracket and a base frame supporting said bracket through another apex portion thereon, whereby bending forces applied to said bracket are substantially eliminated.

3. Thrust supporting means for a vertical shaft type rotary machine, in accordance with claim 2, in which the hollow interior of said annular bracket is in liquid communication with the oil tank so that the interior of said annular bracket is used as a part of the oil tank.

4. Thrust supporting means for supporting a vertical shaft of a rotary machine on a support base member, comprising an annular hollow body of revolution having a triangular cross-section, an annular flange fixed along one of the apex portions of said body supporting a thrust bearing of the machine thereon, an inner cylindrical wall surrounding the vertical shaft and a bottom plate extending between the lower edge of said cylindrical wall and said annular flange to form with said cylindrical wall, said annular flange and said body an oil tank for said thrust bearing, a second apex portion of said body being supported by said base member.

5. Thrust supporting means for a vertical shaft type rotary machine, in accordance with claim 4, in which the hollow interior of said annular bracket is in liquid communication with the oil tank so that the interior of said annular bracket is used as a part of the oil tank.

6. Thrust supporting means as defined in claim 4, further including means for supporting a horizontal guide bearing provided at the third apex of said body.

* * * * *